United States Patent [19]

Johansson

[11] Patent Number: 4,690,333
[45] Date of Patent: Sep. 1, 1987

[54] MEDIA MIXING NOZZLE ASSEMBLY

[75] Inventor: Lars-Erik Johansson, Växjö, Sweden

[73] Assignee: Fläkt AB, Nacka, Sweden

[21] Appl. No.: 719,236

[22] Filed: Apr. 2, 1985

[30] Foreign Application Priority Data

Dec. 4, 1984 [SE] Sweden ............... 8406144

[51] Int. Cl.$^4$ .................................. B05B 7/04
[52] U.S. Cl. ............................ 239/434.5; 239/433
[58] Field of Search .............. 239/433, 434, 434.5, 239/1

[56] References Cited

U.S. PATENT DOCUMENTS

| | | | |
|---|---|---|---|
| 3,809,524 | 5/1974 | Bruhlet et al. | 239/433 X |
| 3,942,724 | 3/1976 | Mocarski | 239/434.5 X |
| 4,185,778 | 1/1980 | Drlik | 239/434.5 X |

FOREIGN PATENT DOCUMENTS

| | | | |
|---|---|---|---|
| 79081 | 5/1983 | European Pat. Off. | 239/434.5 |
| 1097685 | 2/1954 | France | 239/434.5 |

Primary Examiner—Andres Kashnikow
Assistant Examiner—Patrick N. Burkhart
Attorney, Agent, or Firm—Oblon, Fisher, Spivak, McClelland, & Maier

[57] ABSTRACT

The invention relates to a media mixing nozzle assembly (10'), intended for use in a contact reactor to enable a first medium (A) to be mixed with a second medium (B), where the mixed medium is to be used for cleansing a contaminated medium fed to the contact reactor, by bringing the contaminated medium (5a') into contact with the medium mixture (C) containing an absorption material which reacts with the impurities contained by the contaminated medium. The first medium (A) and the second medium (B) are supplied, under overpressure, to a mixing chamber (13') of the nozzle assembly. This chamber (13') is connected with a mixture conveying channel (20) having a cross-section which diverges from the chamber (13') in a manner such that the pressure within the exit orifice (20a) of the channel substantially coincides with the pressure surrounding (21) the channel orifice.

10 Claims, 3 Drawing Figures

MEDIA MIXING NOZZLE ASSEMBLY

TECHNICAL FIELD

The present invention relates to a media mixing nozzle assembly intended for use in a contact reactor for mixing a first medium with a second medium, wherein the resultant media mixture can be brought into contact with a contaminated medium fed to the contact reactor, to cleanse said contaminated medium, and contains inter alia, absorption material which reacts with the impurities contained in the contaminated medium.

The first and second media are fed under overpressure to a mixing chamber located in the nozzle assembly.

The second medium shall comprise in particular a water-suspended absorption substance, with which the impurities present in the contaminated medium are caused to react.

Thus, the media mixing nozzle assembly belongs to that category of nozzle assemblies which comprise a mixing chamber into which there is passed under overpressure for mixture therein a first medium, in the form of air, and a second medium in the form of an absorption substance suspended in water. Such nozzle assemblies can also be termed internal mixing nozzle assemblies.

BACKGROUND ART

Media mixing nozzle assemblies are known to the art in various different forms.

An example of such mixing nozzle assemblies known to the art are those designed to produce an extremely finely divided liquid mist carried by a jet of air, these nozzle assemblies being designated two-media-nozzle assemblies, since two media, water and air, are mixed together therewith. The two media are normally mixed together in such nozzle assemblies with the aid of a pressurized gaseous medium (air). The liquid is finely divided by causing the gaseous medium, which is accelerated during the expansion, to act upon a liquid surface. This liquid surface is caused to travel at a velocity which differs considerably from the velocity of the gaseous medium, normally at a velocity much lower than the velocity of said gaseous medium.

Nozzle assemblies of this kind can, in principle, be divided into two different categories, depending upon the manner in which they operate. The difference between these two nozzle assembly categories is whether the two media to be mixed meet one another within the nozzle assembly or substantially externally thereof. The nozzle assemblies of the first category are aptly named "internal mixing nozzle assembly" while the nozzle assemblies of the latter category are named "external mixing nozzle assembly".

The present invention relates to an internal mixing nozzle assembly. An example of one such internal mixing nozzle assembly is illustrated and described in the European Patent Application No. 82110320.7 published under number A2 0 079 081.

This patent application discloses an arrangement comprising a plurality of internal mixing nozzle assemblies, each of which exhibits a space or chamber to which a liquid line is connected, this space having the form of a rotationally symmetrical atomizing chamber provided with an outlet opening.

Located upstream of the outlet opening is a tubular nozzle or jet adapted for a stream of gas. When a liquid is supplied to the atomizing chamber the gas stream forms a channel centrally of the liquid collection which is atomized to form a liquid mist which passes out through the outlet opening and forms externally of the nozzle assembly a fast moving positively directed aerosol.

Thus, an aerosol comprising finely divided liquid mixed in a gas leaves the outlet opening at high speed and at a pressure in the outlet opening of about 3.5 bars.

DISCLOSURE OF THE PRESENT INVENTION

Technical Problem

In respect of the present state of the art it must be considered technically problematic to provide a media mixing nozzle assembly which can be used in a contact reactor and in which the first and second media to be mixed together are imparted a high pressure when introduced into the nozzle assembly but when the mixture leaves the nozzle assembly outlet orifice have a pressure which coincides with or substantially coincides with the surrounding pressure at the nozzle assembly exit orifice.

Against the background of this problem it will be readily seen that a further technical problem is one of providing a media mixing nozzle assembly in which conditions can be created with the aid of simple means for mixing the media effectively and achieving an effective reduction in pressure against the pressure surrounding the nozzle outlet orifice.

Another technical problem is one of providing conditions in a media mixing nozzle assembly of the aforedescribed kind in which the aforesaid fall in pressure of the mixture with small energy losses can be effected within a relatively short channel, for example a channel having a length of less than one hundred mm.

A further technical problem encountered with a nozzle assembly of the aforedescribed category is one of providing conditions which enable, with a media mixing nozzle assembly of single construction, a first medium, in the form of a liquid, a gas and/or a gaseous mixture containing or not containing particles, to be mixed with a second medium in the form of a liquid, a gas and/or a gaseous mixture, which contains particles or which does not contain particles.

When producing a nozzle assembly in which the aforesaid problems have been overcome, another technical problem is to then provide a simple media mixing nozzle assembly in which the media can be mixed together at mutually controllable ratios between the first medium and the second medium, by regulating the overpressure of the first and/or the second medium in a simple fashion.

Another technical problem is one of providing a media mixing nozzle assembly which has an outer and-/or inner form which enables it to be used to advantage in a contact reactor.

With such a media mixing nozzle assembly placed in a stream of contaminated medium flowing in a contact reactor, such as to achieve through the outer form and internal design of the nozzle assembly effective mixing of a first and a second medium, of which the second medium contains an absorption substance which reacts with the impurities of the contaminated medium, a further technical problem is one of totally eliminating or substantially totally eliminating the undesirable deposit of dried absorption substance on the nozzle and/or its fittings and attachments.

A further technical problem resides in taking measures to solve the aforesaid technical problems and providing conditions which enable the media mixture to be effectively mixed in the contaminated medium in a contact reactor.

It will be understood that a qualified technical problem is one initiating mixture of the media mixture with the contaminated medium immediately adjacent the orifice of the nozzle assembly or its channel.

Another technical problem is one of creating conditions such that the medium mixture moves at supersonic speed in an outlet channel where substantially only air flows out but which provides a speed lower than that of sound, due to irreversible effects (pressure surges), during normal supply of liquid or slurry.

Another technical problem is one of providing conditions whereby, in both instances, the pressure can be reduced in a diverging part of the outlet channel, so that said pressure coincides substantially with the ambient pressure adjacent the outlet orifice.

Solution

The present invention provides a media mixing nozzle assembly which can be used in a contact reactor to enable a first medium to be mixed with a second medium and in which the mixed medium can be used to cleanse a contaminated medium fed to the contact reactor by contacting the contaminated medium with the mixed medium containing an absorption substance which reacts with the impurities of the contaminated medium, said first medium and said second medium being pressurized to an overpressure and supplied to a nozzle assembly chamber which is common to both said media and in which said media are mixed together.

It is proposed in accordance with the invention that the aforesaid mixing chamber of such a media mixing nozzle assembly communicates with a downstream channel intended for the mixture and having a cross-section which diverges from the chamber such that the pressure at the mouth of the channel coincides, either totally or substantially, with ambient pressure prevailing at the mouth of the channel.

In accordance with the invention the channel has a cross-section which adjacent the chamber converges in a direction away from the chamber. The channels shall have a length which is greater than ten mm, but less than one hundred mm, preferably between fifty and thirty mm.

A first medium, in the form of a gas or gas mixture, is arranged to pass the central parts of the channel and a second medium, in the form of a gas-particle suspension and/or liquid mixture, is arranged to pass along the inwardly facing defining surface of the channel.

The ratio of the first medium to the second medium in the media mixture can be regulated by regulating the overpressure of the first and/or the second medium prevailing in the chamber.

When the media mixing nozzle assembly is incorporated in a contact reactor, it is proposed that the first medium is air and the second medium comprises lime which is suspended in water or partially dissolved therein, this latter medium being designated "slurry" or milk of lime. The air jet in the channel has a smaller diameter than the channel and thereWith creates a central passage through a water jet. The air jet disintegrates the water and the lime suspended therein as a result of friction and the friction of the water against the inwardly facing defining surface of the channel. This can be effected by causing the air jet to move at a speed which is considerably higher than the speed at which the water moves. The channel walls are dimensioned so as to gradually taper, to terminate in an annular edge.

The cross-section of the channel diverging from the chamber has a form which, with respect to the overpressure prevailing in the channel, results in supersonic speed at the outlet, where substantially solely air flows out, but produces a speed lower than that of sound, due to irreversible effects (possible pressure surges) under normal liquid or slurry supply conditions. In both cases the pressure in the diverging part is reduced so as to coincide substantially with ambient pressure at the outlet.

The diverging cross-section of the channel is given a form such that, with respect to prevailing pressure and as a result of irreversible effects, there is obtained a reduction in both speed and pressure while the mixture passes the channel towards the outlet orifice thereof when the weight ratio between liquid flow and air flow is greater than one tenth.

The first medium is supplied to the mixing chamber through a jet whose area is smaller than the smallest area of the mixing channel.

Advantages

Those advantages primarily associated with a media mixing nozzle assembly in accordance with the invention reside in the possibility of effectively mixing two media supplied to the media mixing nozzle assembly at overpressure, and that the mixture is able to leave the orifice of a channel at a pressure which coincides totally or substantially with the pressure prevailing at the channel orifice.

In this way deposits of absorption material on the nozzle assembly or its attachments is prevented totally or substantially totally, and effective mixture of surrounding contaminated medium with the mixed medium begins immediately at the channel orifice.

BRIEF DESCRIPTION OF THE DRAWINGS

An embodiment at present preferred and exhibiting the characteristic features significant of the present invention and a manner of application of the invention will now be described with reference to the accompanying drawings, in which.

DESCRIPTION OF AN EMBODIMENT AT PRESENT PREFERRED

Figure 1:
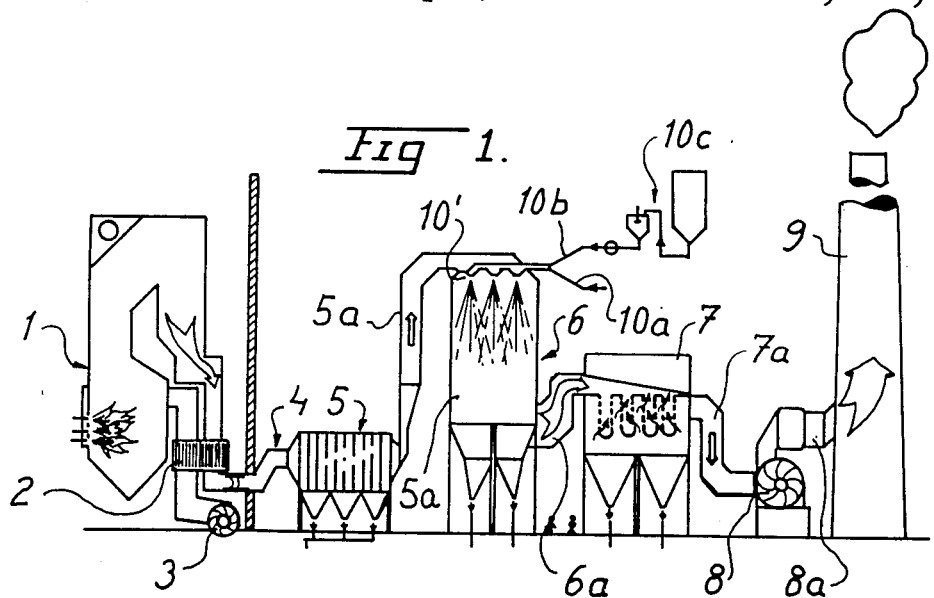
FIG. 1 illustrates schematically in side view and in section a dry flue-gas cleansing plant of known principle construction.

FIG. 1 illustrates schematically and in side view, and also for the sake of clarity in section, a dry flue-gas cleansing plant of known principle construction.

The illustrated plant comprises a boiler section 1, and a heat-exchanger section 2 for transferring heat from flue-gases to combustion air fed to the boiler via a fan 3.

The flue-gases pass along a conduit 4 to an electrostatic dust separator 5, which is connected to a contact reactor via a conduit 5a. The conduit 5a conducts a contaminated medium 5a' fed to the contact reactor. The impurities contained by the medium 5a' may comprise particulate contaminants, hydrogen chloride, sulphur dioxide etc..

Arranged in the upper part of the contact reactor 6 are a number of media mixing nozzles 10' with which a first medium, in the form of air, entering through a conduit 10a can be mixed with a second medium having the form of lime particles suspended in water, entering through a conduit 10b connected to a lime-and-water mixing unit 10c. The media mixture produced in the nozzle assemblies is supplied therefrom to the contact reactor and to the contaminated medium 5a', one of the two mixed media containing absorption material, in the form of lime, which reacts with said impurities.

The cleansed medium passes from the contact reactor 6 through a conduit 6a to a hose filter 7. In the hose filter 7 the cleansed medium passes through a channel 7a to a fan 8, which forces the cleansed medium to a smoke-stack 9, via a channel 8a. Thus, the flue-gases cleansed in mutually separate stages is conveyed to atmosphere through the smoke-stack 9 with the aid of said flue-gas fan 8.

The present invention relates to a media mixing nozzle assembly 10', which is particularly adapted for use in the contact reactor 6 to achieve therein effective cleansing of a contaminated medium passing through the conduit 5a. This supply is effected partly through a conduit 10b for conveying the aforesaid aqueous suspension of absorption substance and partly via a conduit 10a for conveying gas or gaseous mixture, preferably air, so that these two media can be effectively mixed together in a chamber and, via an exit orifice or outlet, sprayed over the interior 6' of the contact reactor 6.

Figure 2:
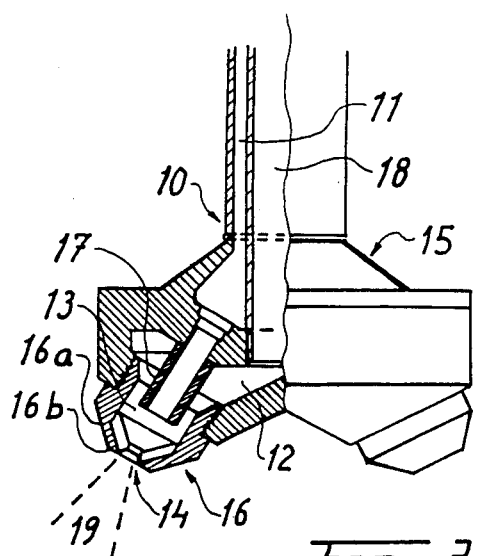
FIG. 2 is a sectional view of a known media mixing nozzle assembly of internal mixing type.

FIG. 2 illustrates a known media mixing nozzle assembly 10 designed in accordance with the principles of an internal mixing nozzle assembly. The nozzle assembly 10 illustrated in FIG. 2, comprises a symmetrically formed central body 15 provided with a cavity 12 into which a main liquid-conducting conduit 18 discharges. The illustrated nozzle assembly 10 is provided with three symmetrically arranged mist jets 16, of which two are shown in the figure. The number of mist jets provided, however, depends upon the application for which the nozzle assembly is intended and may vary between three and ten jets. Each mist jet comprises a tubular housing 16a having at its outer end a circular outlet opening 14 having a diameter of between one and ten mm. Located within the mist jet is a rotational-symmetrical atomizing zone 13. Upstream of the outlet opening 14 is a tubular gas nozzle 17, which is connected to an air supply line 11.

The liquid (water with lime suspended therein) is supplied to the main nozzle assembly 10 through the conduit 18, and fills the atomizing zone 13 and the cavity 12. The liquid is supplied at a pressure of between two and twelve bars. When a gaseous medium intended for atomizing the water is supplied to the gas nozzle 17 at a sufficiently high pressure, i.e. a pressure exceeding the pressure of the water, a gas jet is formed by the atomizing zone 13. In the narrowest section of the mist jet, i.e. at its outlet orifice 14, there will thus exist a two-phase flow and the gas flow will tear apart liquid particles in a manner to generate an atomized mist spray or jet 19.

One problem encountered with a nozzle assembly of the kind illustrated in FIG. 2 is that a pressure of approximately 3.5 bars prevails in the exit orifice 14, resulting in the formation of back-mix eddy currents in the region 16b around the orifice 14, which in practice results in particles suspended or dissolved in the liquid collecting on the nozzle assembly immediately adjacent the exit orifice 14. This collection of particles greatly alters the aerodynamic properties around the nozzle assembly and therewith also impairs the effectiveness thereof.

The necessity of needing to clean the nozzle assemblies from such particle collections at given intervals is both troublesome and laborious.

Figure 3:
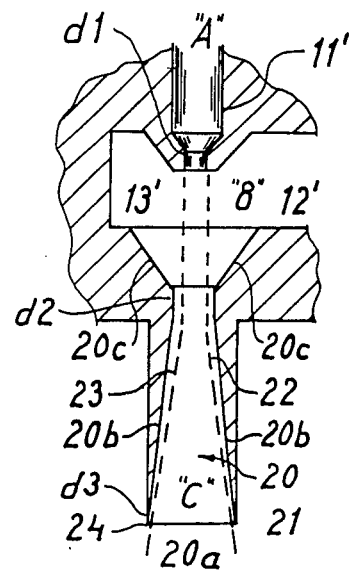
FIG. 3 is a sectional view of an media mixing nozzle assembly of the internal mixing type constructed in accordance with the present invention.

The present invention provides a media mixing nozzle assembly 10' illustrated in section in FIG. 3, which solves this problem and which is particularly intended for use in a contact reactor to enable a first medium to be mixed with a second medium, where the resultant medium mixture shall be used to cleanse a contaminated medium fed to the contact reactor, by contacting the contaminated medium with the medium mixture containing an absorption substance, normally lime, which reacts with the impurities of the contaminated medium. The first medium and the second medium can be passed under overpressure to a common die cavity or die chamber 13' in which said mixing takes place. The first medium in the form of air, is caused to pass through a channel 11' while the second medium, in the form of moist lime particles or lime particles suspended in water, is passed to the nozzle assembly through a channel 12'. Both of these media are supplied to the mixing chamber 13'.

In accordance with the invention, the chamber or space 13' communicates with a downstream channel 20 for the mixture. The channel 20 has a cross-section which diverges from the chamber 13' in a manner such that the pressure at the mouth 20a of the channel coincides, either totally or substantially, with the pressure prevailing in the surroundings 21 adjacent the mouth of the channel. Thus, wall portions 20b are provided with a circular diverging cross-section. The channel 20, however, exhibits in a region adjacent the chamber or space 13' a portion 20c of circular cross-section 20c which converges in a direction from said chamber 13'.

The channel, and particularly the portion 20b thereof shall have a length which is greater than ten mm but smaller than one hundred mm, preferably fifteen to thirty mm.

A first medium "A", in the form of a gas or gaseous mixture, normally air, is aligned to pass through the central parts of the channel 20 in the form of an air jet 22. The second medium "B", in the form of a liquid, optionally having particles suspended therein, is arranged to pass along the inwardly facing conical defining surface 20b of the channel, in the form of a substantially hollow cylindrical jet 23.

The jet 23 will pass along the surfaces 20c and 20b under a relatively high frictional force, while the central part of the jet 23 is broken up by the air jet 22, the air jet 22 moving at a much higher speed than the jet 23, and as the jets 22 and 23 move towards the orifice 20a there takes place, provided that the liquid part is not negligible, under irreversible media transport a drop in pressure, possibly in the form of pressure impacts and also a drop in velocity. At the orifice 20a the mixture "C" has a pressure which is equal or substantially equal to the pressure prevailing in the region 21 around the orifice 20a of the channel 20.

The mixing ratio of the medium mixture "C" can be regulated by regulating the overpressure of the first and/or the second medium in a manner not illustrated.

In a contact reactor it is proposed in accordance with the invention that the first medium "A" comprises air and the second medium "B" comprises lime suspended in water or partially dissolved therein, so-called slurry. The air jet in the channel breaks the slurry up into fine water droplets with lime particles, inter alia as a result of the friction created by the water jet 23 against the inwardly facing defining surface 20b of the channel, particularly in the area of the smallest channel cross-section The wall of the channel 20 shall gradually narrow, to substantially terminate in an annular edge 24, forming the outlet orifice 20a of the channel, in order to prevent the occurrence of minor back-mix eddy currents. In addition, this form provides the advantage that gaseous contaminated medium surrounding the orifice 28 will flow with the mixture "C" into the reactor chamber. Consequently, the effective mixing of the contaminated medium in the jet of mixture "C" begins to take place already at the orifice 20a.

Because the channel has a circular cross-sectional portion which diverges away from the chamber 13' there is obtained, with respect to prevailing pressure and as a result of irreversible processes, a progressive reduction in speed and in pressure as the mixture passes through the channel.

In the embodiment illustrated in FIG. 2, the air pressure in the line 11' may, for example, reach to twelve bars while the pressure of the liquid in the line 12' may reach to eight bars, although the air pressure shall constantly be higher than the pressure of the medium in the line 12'. It is also proposed that a diameter "d1" shall be slightly smaller than a diameter "d2", which in turn is substantially smaller than a diameter "d3" of the channel orifice 20a. In the illustrated embodiment the diameter "d1" is three mm, while the diameter "d2" is five mm and the diameter "d3" is ten mm.

The invention is not restricted to the aforedescribed and illustrated embodiment, and modifications can be made within the scope of the following claims.

I claim:

1. A media mixing nozzle assembly arranged in a contact reactor, said nozzle assembly being arranged partly to enable a first medium to be mixed with a second medium, and partly to cause the resultant mixed medium to be mixed with and to be used to cleanse a contaminated medium fed to the contact reactor, said mixed medium containing an absorption substance, which reacts with the impurities contained in the contaminated medium, whereby said first medium and said second medium are passed, under an overpressure, to a chamber in the nozzle assembly for mixture therein, wherein said chamber is connected to a channel intended for the mixture and having a cross-section which diverges away from said chamber by a degree such that the pressure adjacent the mouth of the channel coincides substantially with the surrounding pressure of the contaminated medium at said channel mouth wherein the channel cross-section diverges from the chamber and has a form which, with respect to prevailing pressure and as a result of irreversible effects, causes a reduction in both speed and pressure while the mixture passes the channel.

2. A nozzle assembly according to claim 1, wherein said channel has a section adjacent said chamber which converges away therefrom.

3. A nozzle assembly according to claim 1 or 2, wherein said channel has a length greater than ten mm and shorter than one hundred mm.

4. A nozzle assembly according to claim 1 or 2 wherein said first medium is in the form of a gas or gaseous mixture, including means aligned to pass the first medium through the central parts of the channel, and wherein said second medium is in the form of a gas and/or liquid mixture having particles suspended therein, including means to pass said second medium along the inwardly facing defining surfaces of the channel.

5. A nozzle assembly according to claim 1 or 2 including means for regulating the overpressure of the first and/or the second medium, whereby the ratios in which the media are present can be regualted.

6. A nozzle assembly according to claim 1 or 2 wherein said first medium comprises air and said second medium comprises lime suspended in water or partially dissolved therein, and in that an, wherein a jet of said first medium in the channel breaks up the lime/water mixture.

7. A nozzle assembly according to claim 1 or 2 wherein the walls of said channel are dimensioned so as to gradually taper and to terminate at an annular edge of intersection with an outer cylindrical wall of said nozzle assembly.

8. A nozzle assembly according to claim 6, wherein the channel cross-section diverges from the chamber and has a form which, with respect to prevailing pressure and as a result of irreversible effects, causes a reduction in both speed and pressure while the mixture passes the channel when the weight ratio between liquid flow and air flow is greater than one tenth.

9. A nozzle assembly according to claim 4 wherein the first medium is supplied to the mixing chamber through a nozzle whose area is smaller than the smallest area of the mixing channel.

10. A nozzle assembly according to claim 6, wherein the channel cross-section diverges from the chamber and has a form which, with respect to prevailing pressure, provides a supersonic speed at the outlet where substantially solely air flows out, but which provides a speed lower than the speed of sound as a result of irreversible effects under normal liquid supply.

* * * * *